(12) United States Patent
Hawkins

(10) Patent No.: US 8,978,096 B2
(45) Date of Patent: *Mar. 10, 2015

(54) SYSTEM AND METHOD FOR FACILITATING THE TRANSFER OF INFORMATION RELATING TO QUALITY OF AN ORGANIZATION

(71) Applicant: Reflexis Systems, Inc., Needham, MA (US)

(72) Inventor: Stan Hawkins, Kennesaw, GA (US)

(73) Assignee: Reflexis Systems Inc., Dedham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,791

(22) Filed: May 25, 2013

(65) Prior Publication Data
US 2014/0075000 A1    Mar. 13, 2014

Related U.S. Application Data

(63) Continuation of application No. 12/951,050, filed on Nov. 21, 2010, now Pat. No. 8,474,010, which is a continuation of application No. 11/323,338, filed on Dec. 30, 2005, now Pat. No. 7,861,281.

(51) Int. Cl.
G06F 21/00    (2013.01)
H04L 29/06    (2006.01)
(Continued)

(52) U.S. Cl.
CPC ............. *H04L 41/50* (2013.01); *H04M 3/4228* (2013.01); *H04M 7/0036* (2013.01); *H04M 2201/38* (2013.01); *H04M 2203/553* (2013.01); *H04W 24/00* (2013.01)
USPC ................. 726/1; 726/12; 709/220; 715/256; 455/452.2

(58) Field of Classification Search
CPC ............................... H04W 24/04; H04W 12/06
USPC ........ 726/1, 12; 709/220; 715/256; 455/452.2
See application file for complete search history.

(56) References Cited

U.S. PATENT DOCUMENTS

| 5,644,723 A | 7/1997 | Deaton et al. |
| 5,677,955 A | 10/1997 | Doggett et al. |

(Continued)

FOREIGN PATENT DOCUMENTS

| WO | WO 01/46783 | 6/2001 |
| WO | WO 2007143882 A1 | 12/2007 |

(Continued)

OTHER PUBLICATIONS

Lior Fink, Seev Neumann; "Taking the high road to web services implementation: an exploratory investigation of the organizational impacts"; SIGMIS Database, vol. 40 Issue 3; Publisher: ACM; Jul. 2009, pp. 84-108.*

(Continued)

*Primary Examiner* — Andrew Nalven
*Assistant Examiner* — Courtney Fields
(74) *Attorney, Agent, or Firm* — Smith Risley Tempel Santos LLC; Steven P. Wigmore

(57) ABSTRACT

A system and method transfers information relating to quality or standards of an organization from a server to a wireless handheld computing device and from the wireless handheld computing device to the server in real-time or near real-time. Each member of an organization can have the same policies and procedures as soon as any of the policies and procedures are updated. The inventive system can allow an organization to also measure compliance and conformance with the distributed policies and procedures. With the handheld computing devices, each member of an organization can complete tests that are closely tied to the distributed policies and procedures. The results of these tests can be transmitted in real-time or near real-time from the handheld computing devices to a central computer server so that an organization can track current performance of all its members relative to the policies and procedures and relative to each other.

20 Claims, 15 Drawing Sheets

(51) Int. Cl.
*H04L 12/24* (2006.01)
*H04M 3/42* (2006.01)
*H04M 7/00* (2006.01)
*H04W 24/04* (2009.01)
*H04W 12/06* (2009.01)
*H04W 24/00* (2009.01)

(56) References Cited

U.S. PATENT DOCUMENTS

| | | | |
|---|---|---|---|
| 5,737,701 | A | 4/1998 | Rosenthal et al. |
| 5,774,551 | A | 6/1998 | Wu et al. |
| 5,794,259 | A | 8/1998 | Kikinis |
| 5,815,665 | A | 9/1998 | Teper et al. |
| 5,855,007 | A | 12/1998 | Jovicic et al. |
| 5,872,850 | A | 2/1999 | Klein et al. |
| 5,911,141 | A | 6/1999 | Kelley et al. |
| 5,983,208 | A | 11/1999 | Haller et al. |
| 6,005,939 | A | 12/1999 | Fortenberry et al. |
| 6,052,710 | A | 4/2000 | Saliba et al. |
| 6,073,106 | A | 6/2000 | Rozen et al. |
| 6,125,352 | A | 9/2000 | Franklin et al. |
| 6,154,768 | A | 11/2000 | Chen et al. |
| 6,192,380 | B1 | 2/2001 | Light et al. |
| 6,199,079 | B1 | 3/2001 | Gupta et al. |
| 6,208,659 | B1 | 3/2001 | Govindarajan et al. |
| 6,233,608 | B1 | 5/2001 | Laursen et al. |
| 6,243,688 | B1 | 6/2001 | Kalina |
| 6,247,029 | B1 | 6/2001 | Kelley et al. |
| 6,253,203 | B1 | 6/2001 | O'Flaherty et al. |
| 6,298,347 | B1 | 10/2001 | Wesley |
| 6,321,339 | B1 | 11/2001 | French et al. |
| 6,356,905 | B1 | 3/2002 | Gershman et al. |
| 6,385,596 | B1 | 5/2002 | Wiser et al. |
| 6,401,085 | B1 | 6/2002 | Gershman et al. |
| 6,491,217 | B2 | 12/2002 | Catan |
| 6,571,279 | B1 | 5/2003 | Herz et al. |
| 6,571,285 | B1 | 5/2003 | Groath et al. |
| 6,584,448 | B1 | 6/2003 | Laor |
| 6,665,704 | B1 | 12/2003 | Singh |
| 6,725,050 | B1 | 4/2004 | Cook |
| 6,845,370 | B2 | 1/2005 | Burkey et al. |
| 2001/0011250 | A1 | 8/2001 | Paltenghe et al. |
| 2002/0002684 | A1 | 1/2002 | Fox et al. |
| 2002/0107972 | A1 | 8/2002 | Keane |
| 2006/0036941 | A1 | 2/2006 | Neil ............................. 715/526 |

FOREIGN PATENT DOCUMENTS

WO   WO 2007149862 A1    12/2007
WO   WO 2009067063 A1 *  5/2009

OTHER PUBLICATIONS

Microsoft.Net Passport Technical Overview, Sep. 2001, entire article.
Microsoft.Net Passport, "What'New", Sep. 2001, entire article.
Webpage entitled: "Free Password Manager—Store passwords—Desktop or Online", available at www.passwordsafe.com, 1 page.
*Secure Your Web Site With Passport*, "Implement Passport", *Visual Studio Magazine*, pp. 1-3.
Jon Rauschenberger, *Secure Your Web Site With Passport*, "Simplify Your Web Site Visitors' Experience by Authenticating Them", *Visual Studio Magazine*, pp. 1-3.
*Secure Your Web Site With Passport*, "Sign In, Please", *Visual Studio Magazine*, pp. 1-3.
*Secure Your Web Site With Passport*, "Passport Key to Hailstorm's Success", *Visual Studio Magazine*, pp. 1-2.
*Implementing Mobile Passport*, pp. 1-5.
Webpage entitled: "Zkey—Corporate", available at www.zkey.com, 1 page.
Alan Cohen and Walaika Haskins, "Grab-and-Go Web", *PC Magazine*, Oct. 19, 2000, pp. 1-3.
Webpage entitled: "LinkUall.com—Products—Calendars and Address books", available at www.linkuall.com, pp. 1-2.
Webpage entitled: "LinkUall.com—About Us—LinkUall Technology", available at www.linkuall.com, 1 page.
Microsoft PressPass, Microsoft.Net: "A Platform for the Next Generation Internet", Jun. 22, 2000, pp. 1-7.
Microsoft Press Release, "Microsoft Passport Offers Streamlined Purchasing Across Leading Web Sites", Oct. 11, 1999, pp. 1-4.
Graeme Bennett, PC Buyer's Guide.com, (updated Jun. 22, 2000), "NGWS—Microsoft's Dot Net Strategy", pp. 1-5.
Webpage entitled: "Microsoft's Passport: A single name, password and wallet for the web," available at www.passport.com, pp. 1-2.
Webpage entitled: "Microsoft's Passport *Member Services*, What is Passport", available at www.passport.com, pp. 1-12.
Webpage entitled: "Microsoft's Passport: Streamlining Commerce and Communication on the Web", available at www.passport.com, Oct. 11, 1999, pp. 1-3.
Webpage entitled: "Online Business Use Microsoft Passport Single Sign-In and Wallet Services to Provide Customers with Secure and Convenient Shopping", available at www.microsoft.com, May 17, 2000, pp. 1-2.
Garry Gunnerson, "EZ Login", *PC Magazine*, pp. 1-2, Mar. 14, 2000.
"Ezlogin.com Introduces Liveclips, Enabling Net Users to Clip Content from Anywhere on the Web and Paste it on a Custom Page", Java Industry Connection, Mar. 8, 2000, pp. 1-2.
Webpage entitled: "724 Solutions—Products—Wireless Internet Platform", available at www.724.com, pp. 1-3.
Webpage entitled: "Solutions—Products—in-Commerce", available at www.724.com, pp. 1-4.
Webpage entitled: "724 Solutions—Products—Financial Services", available at www.724.com, 1 page.
Gator Press Release, "Gator.Com Delivers on the Promise of the Electronic Commerce Modeling Language (ECML) Standard Today: Gator offers one-click shopping at over 5,000 e-commerce sites today", Jun. 14, 1999, pp. 1-2.
Gator Press Release, "Internet Start-up Gator.com Introduces Gator, the Web's First Smart Online Companion New Internet product offers one-click login and express registration and checkout across the web", Jun. 14, 1999, pp. 1-3.
Gator Press Release, "Gator Helps Consumers at More than 25,000 E-Commerce and Registration Sites in First Month of Usage: Software an invaluable companion for more than 80,000 online consumers", Aug. 3, 1999, pp. 1-2.
Webpage entitled: "Affiliate Application" *How do Gator, Price Helper, and OfferCompanion Work?*, available at www.gator.com, 1 page.
Webpage entitled: "Yodlee: e-Personalization Solutions", available at www.yodlee.com, pp. 1-2.
Webpage entitled: "Yodlee: e-Personalization Platform", available at www.yodlee.com, 1 page.
Webpage entitled: "Yodlee: e-Personalization Applications", available at www.yodlee.com, 1 page.
Webpage entitled: "Yodlee for Web: One-Click Access to All Personal Accounts", available at www.yodlee.com, 1 page.
Webpage entitled: "Yodlee for Mobile: Simplify Your Life on the Road with Yodlee2Go", available at www.yodlee.com, 1 page.
Webpage entitled: "Yodlee2Go: Palm OS Wireless", available at www.yodlee.com, 1 page.
Webpage entitled: "Yodlee2Go: Web-enabled Phones", available at www.yodlee.com, 1 page.
Webpage entitled: "Security Overview", available at www.yodlee.com, pp. 1-2.
Webpage entitled: "Co-Brand Partner Opportunities", available at www.yodlee.com, pp. 1-2.
Webpage entitled: "Content Partner Opportunities", available at www.yodlee.com, 1 page.
Webpage entitled: "Sweet Enonymity", available at www.enonymous.com, pp. 1-2.
Webpage entitled: "Vision For An Enonymous Infomediary", available at www.enonymous.com, pp. 1-3.
Webpage entitled: "Learn More", available at www.digitalme.com, pp. 1-2.

(56) References Cited

OTHER PUBLICATIONS

Webpage entitled: "Take Control", available at www.digitalme.com, pp. 1-2.
Webpage entitled: "Make it Convenient", available at www.digitalme.com, pp. 1-3.
Webpage entitled: "Create Relationships", available at www.digitalme.com, pp. 1-2.
Webpage entitled: "FAQ", available at www.digitalme.com, pp. 1-2.
Webpage entitled: "Digitalme™ Fact Sheet (www.digitalme.com)", available at www.digitalme.com, pp. 1-3.
"Choicepoints Unveils New Web-based Pre-employment Screening Service", BusinessWire p. 1287, May 17, 1999.
Rajiv Chakravorty, Sutabn Agarwal, Suman Banerjee, Ian Pratt, "A mobile bazaar for wide-area wireless services", Dec. 2007. Wireless Networks, vol. 13 Issue 6, Publisher: Kluwer Academic Publishers, pp. 757-777.
Oriana Riva: "Contory: a middleware for the provisioning of context information on smart phones"; Nov. 2006; Middleware '06: Proceedings of the ACM/IFIP/USENIX 2006 International Conference on Middleware; Publisher: Springer-Verlag New York, Inc.: pp. 219-239.

\* cited by examiner

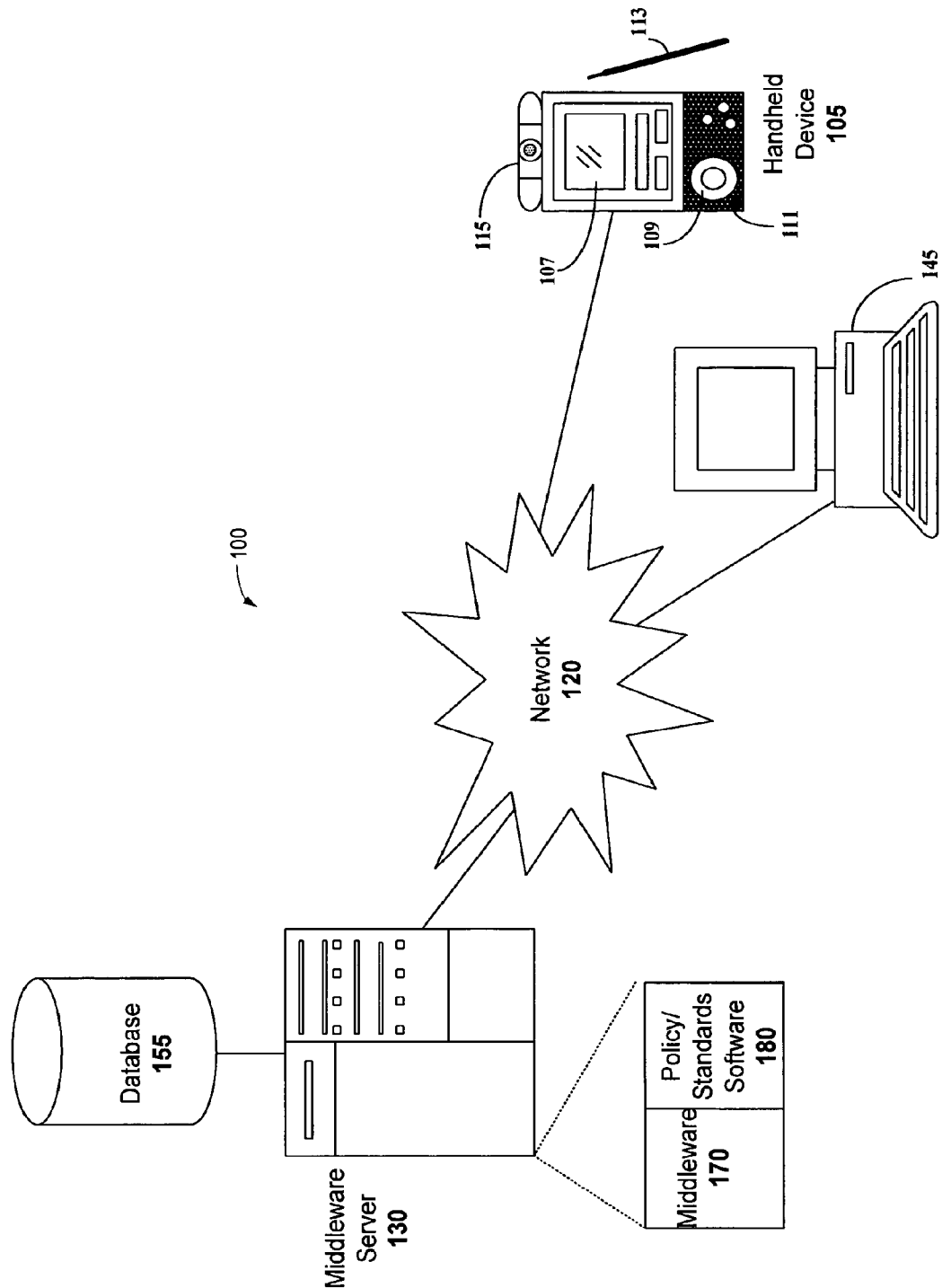

Sheet Scoring Report

Scoring Model Name: Food Safety

Start Date: 01/28/2005    End Date: 6/29/2005

| Grouping | Store | Store Name | Sheet Type | Sheet | Points Earned | Points Available | % Points Earned | Question |
|---|---|---|---|---|---|---|---|---|
| detail | 847 | Sandy Springs FSU | Food Safety | General - All Areas | 0 | 0 | | Have all employees with fever, diarrhea, or open sores been restricted from work? |
| detail | 847 | Sandy Springs FSU | Food Safety | General - All Areas | 1 | 1 | 100.0% | Is ladies' restroom stocked with paper towels and soap (and sanitizer where required |
| detail | 847 | Sandy Springs FSU | Food Safety | General - All Areas | 1 | 1 | 100.0% | Is men's restroom stocked with paper towels and soap (and sanitizer where required |
| detail | 847 | Sandy Springs FSU | Food Safety | General - All Areas | 1 | 1 | 100.0% | Is hand wash station #1 stocked with paper towels and soap (and sanitizer where re |
| detail | 847 | Sandy Springs FSU | Food Safety | General - All Areas | 1 | 1 | 100.0% | Is hand wash station #2 stocked with paper towels and soap (and sanitizer where re |
| detail | 847 | Sandy Springs FSU | Food Safety | General - All Areas | 1 | 1 | 100.0% | Is hand wash station #3 stocked with paper towels and soap (and sanitizer where re |
| detail | 847 | Sandy Springs FSU | Food Safety | General - All Areas | 0 | 0 | | Is hand wash station #4 stocked with paper towels and soap (and sanitizer where re |
| detail | 847 | Sandy Springs FSU | Food Safety | General - All Areas | 1 | 1 | 100.0% | Are gloves being worn when handling raw chicken? |
| detail | 847 | Sandy Springs FSU | Food Safety | General - All Areas | 0 | 1 | 0.0% | Are gloves being worn when preparing any ready-to-eat food that has a shelf life lon |
| detail | 847 | Sandy Springs FSU | Food Safety | General - All Areas | 0 | 0 | | Are gloves being worn when a team member has a cut or a bandage on his/her han |
| detail | 847 | Sandy Springs FSU | Food Safety | General - All Areas | 0 | 1 | 0.0% | Are gloves being worn when removing trash or cleaning restroom? |
| detail | 847 | Sandy Springs FSU | Food Safety | General - All Areas | 1 | 1 | 100.0% | Are gloves being worn if the local health department or operator has a specific requi |
| detail | 847 | Sandy Springs FSU | Food Safety | General - All Areas | 1 | 1 | 100.0% | Are team members washing hands after using restroom, after breaks, after sneezing, surface? |
| detail | 847 | Sandy Springs FSU | Food Safety | General - All Areas | 1 | 1 | 100.0% | Does the sanitizing solution in the compartment sink have a chlorine concentration of |
| detail | 847 | Sandy Springs FSU | Food Safety | General - All Areas | 1 | 1 | 100.0% | Does the sanitizing solution in the spray bottle have a chlorine concentration of 50-10 |

FIG. 1G

Budgets
Estimate cost of repairs for a budget

Date : 4/4/2005  Time : 7:16:01 PM
Store # : 905  Store Name : Mall
Rep : David

| Budgets | Points In Section | Points Evaluated | Points Earned | Score |
|---|---|---|---|---|
| 02 - Site Construction | 215700 | 405700 | 12270 | 3.0% |
| 03 - Concrete | 3000 | 3000 | 0 | 0.0% |
| 05 - Metals | 75000 | 75000 | 6000 | 8.0% |
| 06 - Wood and Plastics | 127750 | 127750 | 0 | 0.0% |
| 07 - Thermal and Moisture Protection | 112500 | 112500 | 550 | 0.5% |
| 08 - Doors and Windows | 61000 | 65000 | 2500 | 3.8% |
| 09 - Finishes | 129500 | 129500 | 1320 | 1.0% |
| 10 - Specialties | 160625 | 160625 | 4500 | 2.8% |
| 11 - Equipment | 116804 | 52450 | 1500 | 2.9% |
| 12 - Furnishings | 8800 | 7000 | 0 | 0.0% |
| 13 - Special Construction | 877000 | 877000 | 10000 | 1.1% |
| 14 - Conveying Systems | 100000000 | 100000000 | 0 | 0.0% |
| 15 - Mechanical | 340850 | 340850 | 100 | 0.0% |
| 16 - Electrical | 29800 | 1440000 | 0 | 0.0% |
| Total: | 102258329 | 103796375 | 38740 | 0.0% |

FIG. 11

SYSTEM AND METHOD FOR FACILITATING THE TRANSFER OF INFORMATION RELATING TO QUALITY OF AN ORGANIZATION

RELATED APPLICATIONS

The patent application is related to U.S. patent application Ser. No. 10/421,639, entitled "SYSTEMS AND METHODS FOR PROVIDING FIELD FORCE AUTOMATION IN BIG BOX RETAIL ENVIRONMENTS," filed Apr. 22, 2003, now U.S. Pat. No. 8,694,352.

The patent application is related to U.S. patent application Ser. No. 11/317,646, entitled "SYSTEM AND METHOD FOR COMMUNICATING DATA BETWEEN A WIRELESS MOBILE HAND-HELD COMPUTER AND A BACK-END COMPUTER SYSTEM," filed Dec. 23, 2005, now U.S. Pat. No. 8,028,039.

The patent application is related to U.S. patent application Ser. No. 11/323,562, entitled "SYSTEMS AND METHOD FOR MANAGING ASSET INSTALLATION AND EVALUATION," filed concurrently herewith on Dec. 30, 2005, now U.S. Pat. No. 7,957,990.

The patent application is related to U.S. patent application Ser. No. 11/324,130, entitled "SYSTEM AND METHOD FOR FACILITATING SALES UTILIZING CUSTOMER RELATIONSHIP MANAGEMENT TECHNOLOGY," filed concurrently herewith on Dec. 30, 2005, now U.S. Pat. No. 7,708,202.

FIELD OF THE INVENTION

The invention relates generally to wireless handheld computing devices and computer servers that communicate with the devices for managing quality of an organization. More particularly, the invention relates to a system and method for facilitating the transfer of information relating to quality of an organization from a server to a wireless handheld computing device and from the mobile handheld computing device to the server in real-time or near real-time.

BACKGROUND

Many organizations have several different members who may be located in diverse geographic locations. This is often the case for businesses who may have several different locations. For example, a retail business can have several different stores in several different neighborhoods across a city. For national organizations, a retail business can have dozens of stores in several cities of different states.

While organizations such as retail businesses embrace this geographical diversity because it equates to more sales volume, this geographical diversity can also add to operation costs and to the complexity of running each retail front uniformly. Organizations, such as retail businesses, understand the value of repeat consumers associating a certain level of quality with a brand of a business. To achieve this consistent level of quality at each geographic location as perceived by an ordinary repeat consumer, each business under the umbrella of the brand must provide the same service(s) or product(s) (or both).

In order to provide exact same service(s) or product(s) (or both) at each geographic location, an organization must prepare a set of guidelines or standards that each business at a particular geographic location must follow. It is in this way that an organization can maintain a certain level of quality irrespective of the location of its business. In the past and currently, leaders of organizations, such as businesses, prepare standards and guidelines addressing quality on paper and distribute these paper standards and guidelines to each of its members. These paper documents can be sent via fax, mail, post, or courier. In some conventional organizations, documents can be distributed via e-mail in which each member of the organization would receive the document and print it out at the location received with a printer.

While the aforementioned delivery methods are advanced when compared to the plain post-and-mail traditional method of past, all of these methods still waste significant amounts of paper whenever a standard or guideline is updated by a leader of the organization. Further, lag time still exists between the completion of a standard or guideline and the actual receipt with implementation by a particular member. For example, even in the conventional e-mail context, a busy manager of local business may not have time to print out new guidelines or standards when a leader at the national level has e-mailed a change to all of the collective local businesses. This lag time in receiving a change in or receiving a completely new standard or guideline can be significant.

For example, if a leader at the national level wanted to introduce a new product or service at the same time at all geographic locations, those members who did not print out the guidelines when the e-mail containing the information about the new product or service would never know about the new product or service. Even more significant from a business perspective, if a leader of a business organization wanted to increase prices for a product or service across all geographic locations, those members who did not receive this directive would equate to substantial losses in profits for the business organization.

Once a local member of national organization receives a standard or guideline, success in implementing the standard or guideline is also not guaranteed. To help with implementing standards, leaders of organizations also provide quality tests or measures to its local members. Often these tests are on paper forms and they are self-administered by a member who fills out the form and then mails it back to the leader(s) of the organization. The leader(s) of the organization will sometimes outsource the grading of these forms to a third party agency who will compile the results of all members and provide scores to the leader(s). This grading "process" can take some time and if an organization is constantly changing its guidelines or standards, the leader(s) will never know the true performance of each of its members in maintaining a certain level of quality for product(s) or service(s) (or both).

Another drawback associated with quality tests or measures is that leader(s) often rely on its members to grade themselves. While honest answers from each member would help the overall organization to identify its members who are strong and its members who are weak, it becomes apparent that self-administered tests by members would not attract absolute honesty for obvious reasons. For example, a local member who is afraid that he may lose his membership from an organization due to low or poor performance on quality tests may inflate his true or actual scores in order to deceive leaders that the local member is performing adequately or above the normal range for concern.

Another problem with quality tests or measures and even the creation of policies and/or guidelines is the ability to track the evolution of these elements and any interrelationships among common elements. For example, in certain areas of businesses, certain elements can overlap. For example, in food product safety, procedures can be common to several different types of food products. When handling raw food, employees should wear gloves to prevent spreading germs.

An organization may have guidelines or procedures for handling different types of specific food products. So if there is a guideline or procedure that is common to two or more different products, such as wearing gloves when handling a food product, it may be necessary for an organization to update each guideline or procedure under each product separately even if they share a common guideline or procedure.

Accordingly, there remains a need for a method or system that help track guidelines or procedures that may be common to different products or services. There is also a need in the art for a method and system that can provide members of an organization with the most current information on quality so that each of the members can provide uniform products or services (or both). There is a further need in the art for a method and system that can allow members of an organization to accurately measure its performance relative to quality information provided by the organization.

SUMMARY OF THE INVENTION

The invention satisfies the above-described and other needs by providing a system and method for facilitating the transfer of information relating to quality or standards of an organization from a server to a wireless handheld computing device and from the wireless handheld computing device to the server in real-time or near real-time. The system and method can allow an organization, such as a business, to distribute information in real-time or near real-time relating to quality or standards when this information is updated. This ability to transfer quality or standards information in real-time or near real-time after the information has been updated can be valuable to organizations that may have operations in several different geographic locations. For example, in retail businesses or franchises that have several stores at different locations, the ability to maintain a certain level of quality that is consistent from one store to another is very important and allows retail businesses or franchises to create brand security.

To achieve brand security, an organization usually requires each of its members to follow policies and procedures that are closely connected with the organization's quality or standards. The inventive system and method can allow an organization to create policies and procedures on a central computer server and to distribute them in real-time or near real-time to each of its members with wireless handheld computing devices. This means that each member of an organization can have the same policies and procedures as soon as any of the policies and procedures are updated.

In addition to distributing updated policies and procedures in real-time or near real-time, the inventive system and method can allow an organization to also measure compliance and conformance with the distributed policies and procedures. With the handheld computing devices, each member of an organization can complete tests that are closely tied to the distributed policies and procedures. The results of these tests can be transmitted in real-time or near real-time from the handheld computing devices to a central computer server so that an organization can track current performance of all its members relative to the policies and procedures and relative to each other.

The inventive system and method can provide a computer program for creating policies, procedures, and tests that are distributed to the wireless handheld computing devices. The computer program can allow an organization to create policies, procedures, and tests in a consistent manner and in which related elements are linked to one another. In other words, if any policies, procedures, or tests have related or overlapping elements, any updates to one element can automatically be applied to any related elements. For example, if a first test has a first question and a second test has the same first question, any updates to the first question of the first test can be automatically applied to the same first question in the second test. In this way, the inventive method and system can also control quality of the policies, procedures, and tests that are distributed to the wireless mobile handheld computing devices.

According to another exemplary aspect, the inventive method and system can provide separate data stores for an organization and each member of the organization. In other words, a single member of an organization, such as a retail store, can complete tests associated with policies and procedures and save the results of these tests in a data store that is only accessible by the retail store itself. This secure storage of data that is only accessible by the retail store itself can promote honesty and integrity in the answers for the tests so that the individual retail store can measure its own true performance. Meanwhile, the organization can maintain its own separate data store for tests that are completed by management when management visits its members, such as a retail store.

According to one exemplary aspect, the data store that maintains the results of the tests completed by senior management can be shared with each member of the organization so that each member, such as a retail store, can compare the results of the management tests against the results of the retail store's private tests. This data store that maintains the results of the tests completed by senior management allows the organization track performance across the entire organization as well as the performance of each individual member of the organization.

Additional aspects, features, and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

FIG. 1A is a functional block diagram of some core architectural components for a middleware system that communicates data between wireless mobile hand-held computers and a database according to one exemplary embodiment of the invention.

FIG. 1G is an exemplary screen display of software running on the middleware server for creating summary scoring reports based on answers received from one or more wireless handheld computers at different locations according to one exemplary embodiment of the invention.

FIG. 1I is yet another exemplary screen display of software running on the middleware server for creating budget reports based on answers received from one or more wireless handheld computers at different locations according to one exemplary embodiment of the invention.

DETAILED DESCRIPTION OF EXEMPLARY EMBODIMENTS

Figure 1B:
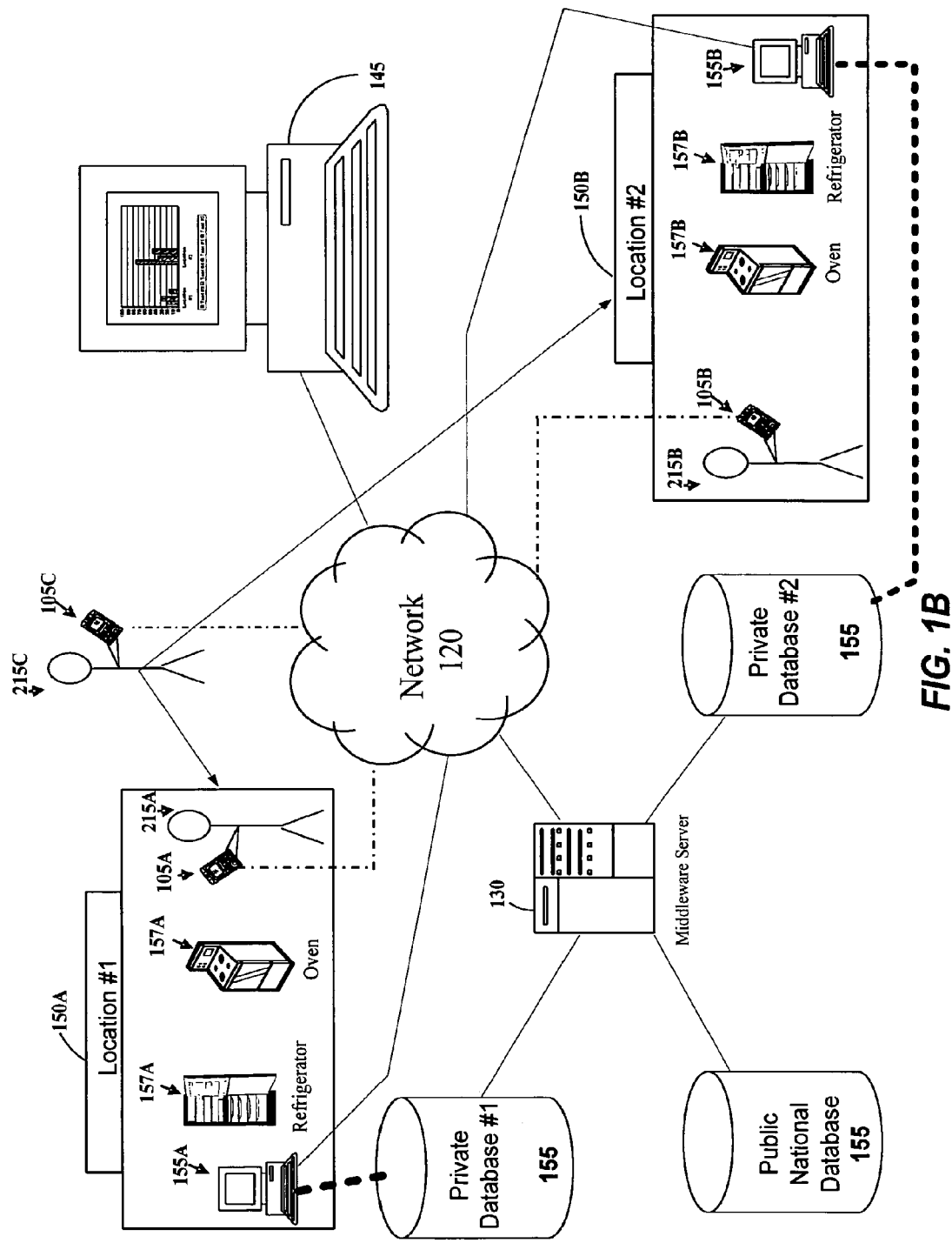
FIG. 1B is a functional block diagram of two locations of an organization that can store quality test results in separate private databases and a public national database according to one exemplary embodiment of the invention.

A system and method can help transfer information relating to quality or standards of an organization from a server to a wireless handheld computing device and from the wireless handheld computing device to the server in real-time or near real-time. The system and method can allow an organization, such as a business, to distribute information in real-time or near real-time relating to quality or standards when this information is updated. Each member of an organization can have the same policies and procedures as soon as any of the policies and procedures are updated.

In addition to distributing updated policies and procedures in real-time or near real-time, the inventive system and method can allow an organization to also measure compliance and conformance with the distributed policies and procedures. With the handheld computing devices, each member of an organization can complete tests that are closely tied to the distributed policies and procedures. The results of these tests can be transmitted in real-time or near real-time from the handheld computing devices to a central computer server so that an organization can track current performance of all its members relative to the policies and procedures and relative to each other.

Exemplary embodiments of the invention will hereinafter be described with reference to the drawings, in which like numerals are used to indicate like elements.

Referring now to FIG. 1, this Figure is a block diagram illustrating an exemplary operating environment for implementation of various exemplary embodiments of the inventive system 100. Network devices are interconnected via a network 120. The network 120 can comprise a wired or wireless telecommunication means by which network devices can exchange data, including for example, a local area network ("LAN"), a wide area network ("WAN"), an intranet, an Internet, or any combination thereof. Throughout the discussion of exemplary embodiments of the invention, it should be understood that the terms "data" and "information" are used interchangeably herein to refer to text, images, audio, video, signatures, and/or any other form of information that can exist in a computer-based environment.

A network device can be any device capable of transmitting and receiving data over the network 120. For example, a network device can be a middleware server 130, a handheld device (comprising a wireless handheld computer) 105, and/or dedicated storage devices, such as a database 155. The middleware server 130 can comprise software for interacting, e.g., via the network 120 and/or a direct data link (not shown), for processing data from the database 155. A desktop computer 145 can interact with the middleware server 130 via the network 120 using web browser application software.

The middleware software 170 running on the middleware server 130 can comprise software as described in "System and Method For Communicating Data Between Wireless Mobile Hand-Held Computer and a Back-End Computer System," filed on Dec. 23, 2005, which is hereby fully incorporated herein by reference. The middleware software 170 can manage information received from and transmitted to numerous wireless handheld computers 105.

The policy/standards software 180 can comprise software for creating and managing task sheets that are sent to wireless handheld computers 105. The software can comprise software as described in co-pending U.S. patent application Ser. No. 10/421,639, entitled "Systems and Methods for Providing Field Force Automation in Big Box Retail Environments," filed Apr. 22, 2003, which is hereby fully incorporated herein by reference.

By way of illustration only, the handheld device 105 can be a Microsoft Windows® CE-based device, such as the Casio 'Cassiopeia,' the Dell™ 'Axim™,' etc., a Palm OS-based personal digital assistant (PDA), or any other suitable handheld computing device. The handheld device 105 can comprise input/output ("I/O") devices, such as a display screen 107, integrated controls (buttons) 109, a camera 115, a scanner (not shown), a microphone 111, a speaker (not shown), and a printer 112. The handheld device 105 can be configured with any combination of integrated I/O devices or add-on I/O devices. Add-on I/O devices can be coupled to the handheld device 105, e.g., by way of an expansion slot, port, wireless link, or other suitable interface. The display screen 107 can be touch-sensitive or motion-sensitive to accept input signals from a pointing device 113, such as a stylus or finger.

The handheld device 105 can further comprise communication capabilities in any well-known or emerging form, including, e.g., a modem, a network interface, or the like. Through such capabilities, the handheld device 105 can communicate with the network 120 via a wireless connection and/or via a wired connection. By communicating via a wireless connection, for example, the handheld device 105 can transmit data to, and receive data from, the middleware server 130 in real-time or near real-time. Thus, an organization can monitor performance of organization members in real-time or near real-time. By way of example, see U.S. patent application Ser. No. 11/323,562, entitled "Systems and Method For Managing Asset Installation and Evaluation," filed concurrently herewith on Dec. 30, 2005, now U.S. Pat. No. 7,957,990, which is hereby fully incorporated herein by reference.

A handheld device user can continually receive updated organization information relating to quality that can assist them in performing their work assignments at different locations. In one embodiment of the invention, the handheld device 105 can communicate with the network 120 via another network device, for example, if connected to the other network device by way of a cradle, cable, or other device or wireless connection. The handheld device 105 can be configured to communicate according to any suitable communication protocol(s).

As illustrated in FIG. 1, handheld devices 105, a middleware server 130, desktop computer 145 may all be interconnected by way of a network 120. Desktop computers 145 may include any processor-driven devices that are configured to communicate with the middleware server 130 via the network 120 or a dedicated communications link.

In the environment shown in FIG. 1, data collected with a handheld device 105 by an organization representative may be transmitted to the middleware server 130 and may be made instantly (or nearly instantly) available to the other handheld devices 145 connected to the network 120. The middleware server 130 may include or be in communication with the database 155 for storing the data received by the handheld device 105. The database 155 may be configured to store data in an encrypted format, using a relational data storage model, an object oriented data storage model, a data aggregate storage model (e.g., one or more XML aggregates) or any other suitable data storage model. As one example, desktop computers 145 may interact with the middleware server 130 via the network 120 using web browser software. By way of example, see discussed in U.S. patent application Ser. No. 10/421,639, entitled "Systems and Methods for Providing Field Force Automation in Big Box Retail Environments," filed Apr. 22, 2003, now U.S. Pat. No. 8,694,352, and U.S. patent application Ser. No. 11/317,646, entitled "System and Method For Communicating Data Between Wireless Mobile Hand-Held Computer and a Back-End 20 Computer System," filed on Dec. 23, 2005, now U.S. Pat. No. 8,028,039, each of which is hereby fully incorporated herein by reference.

Each organization representative may use a handheld device 105 to collect data while working and or visiting a location 150. The organization representative may complete task sheets that relate to quality of the organization by using the handheld device 105. The handheld device 105 of the invention may be configured with hardware and/or software for receiving and storing various types of data, including text, signatures, images and sounds. By way of illustration only, the handheld device 105 may comprise a Microsoft Windows CE-based device, such as the Casio 'Cassiopeia,' the Dell 'Axim,' etc., a Palm OS-based personal digital assistant (PDA), or any other suitable handheld computing device.

Referring now to FIG. 1B, this figure is a functional block diagram of two locations 150A, 150B of an organization that can store quality test results in separate private databases 155A, 155B and a public national database 155C according to one exemplary embodiment of the invention. A first organization rep 215A that manages the first location 150A can use a wireless handheld computer 105A to track quality measures, such as answers to questions that relate to quality. For example, a first organization rep 215A can track the cleanliness of two pieces of equipment, such as a first refrigerator 157A and a first oven 159A.

The data produced by the first wireless handheld computer 105A can be stored in the first private database 155A that is only accessible by the first organization rep 215A. Similarly, a second organization rep 215B that manages the second location 150B can use a wireless handheld computer 105B to track quality measures, such as answers to questions that relate to quality. For example, the second organization rep 215A can track the cleanliness of two pieces of equipment, such as second refrigerator 157B and a second oven 159B. The data produced by the second wireless handheld computer 105B can be stored in the second private database 155B that is only accessible by the second organization rep 215B.

A third organization rep 215C can track the cleanliness of all the pieces of equipment from the first and second locations 150A, 150B such as the first and second refrigerators 157A, 158B and the first and second ovens 159A, 159B. Unlike the data from the first and second wireless handheld computers 105A, 105B, the data from the third wireless handheld computer 105C can be stored in a national public database 155C that can be accessed by the first, second, or third organization reps 215A, 215B, 215C.

In this way, each location 150 can complete tests associated with policies and procedures and save the results of these tests in a data store 155A, 155B that is only accessible by the location itself. This secure storage of data that is only accessible by the location 150 itself can promote honesty and integrity in the answers for the tests so that the individual location 150 can measure its own true performance: Meanwhile, the organization can maintain its own separate data store for tests that are completed by the third organization reps 215C when each third organization rep 215C visits an organization member location 150A, 150B.

The third data store 155C that maintains the results of the tests completed by senior management can be shared with each member of the organization so that each member, such as a the first and second locations 150A, 150B, can compare the results of the management tests against the results of a location's private tests. This third data store 155C that maintains the results of the tests completed by senior management allows the organization track performance across the entire organization as well as the performance of each individual member of the organization. The organization can access the third data store 155C with a desktop 145 that can display results of the various locations 150A, 150B.

Figure 1C:
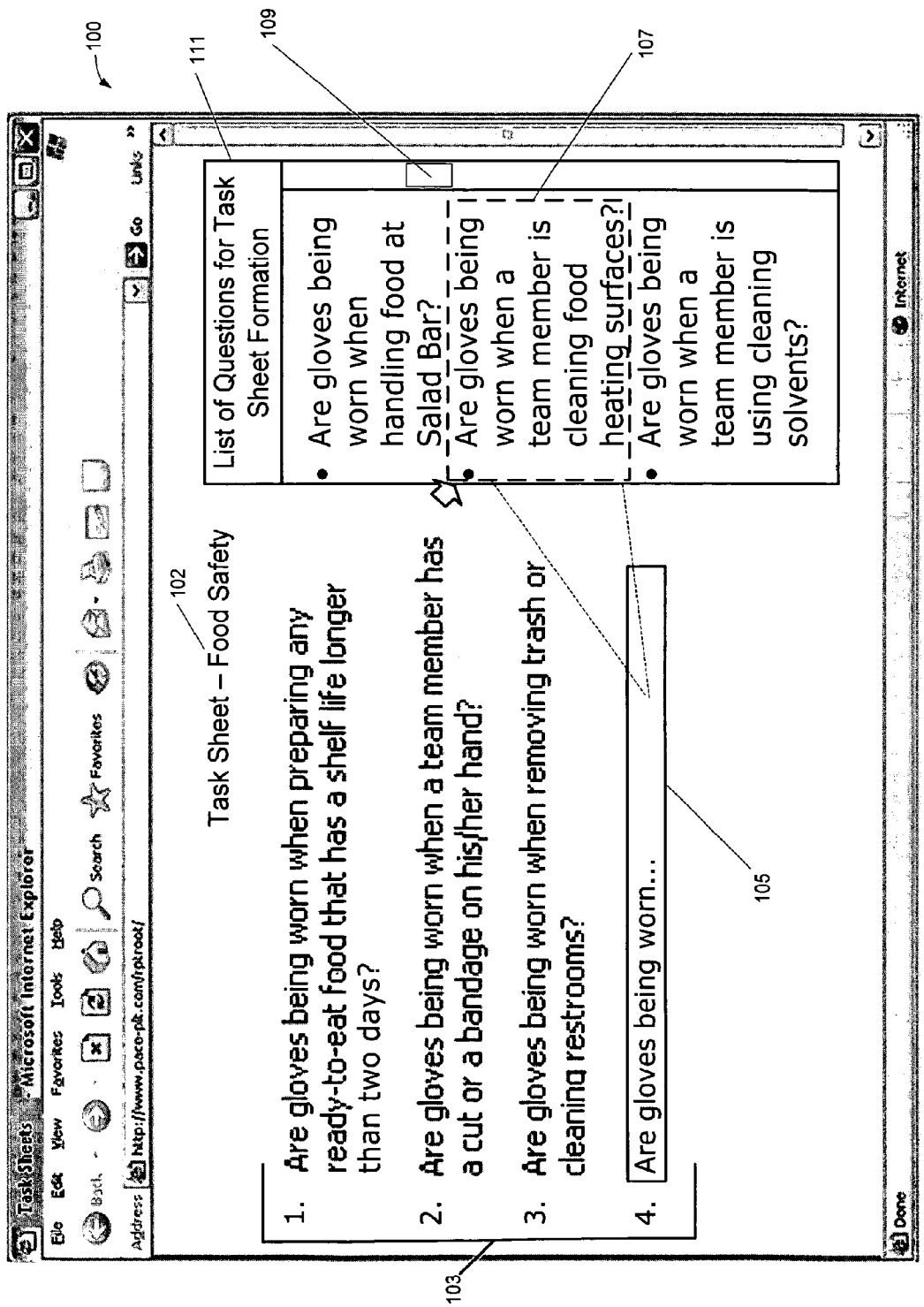
FIG. 1C is an exemplary screen display of software running on the middleware server for creating task sheets according to one exemplary embodiment of the invention.

Referring now to FIG. 1C, this Figure is an exemplary screen display 100 of software running on the middleware server 130 for creating task sheets according to one exemplary embodiment of the invention. The screen display 100 comprises a task sheet formation area. Within the task sheet formation area, a user can enter a title 102. With the task sheet formation interface, a user can create questions that can be used to measure quality of an organization. The example illustrated in FIG. 1C has the title 102 of "Food Safety."

To form a task sheet that comprises a sequence of questions 103 that relate to a quality standard or directive, such as "Food Safety", a user can select questions from a database or list of questions 111. For example, a user can select a question 107 for insertion into the sequence of questions 103 at next question region 105. A user can scroll through the list of questions 111 by using a button 109 on a scroll bar. A user can also create new questions by entering a new question using a keyboard in the next question region 105. Any new questions can be automatically added to the database or list of questions 111. Further details of how new questions are entered and tracked by the database are described below in connection with FIG. 2A described below.

Figure 1D:
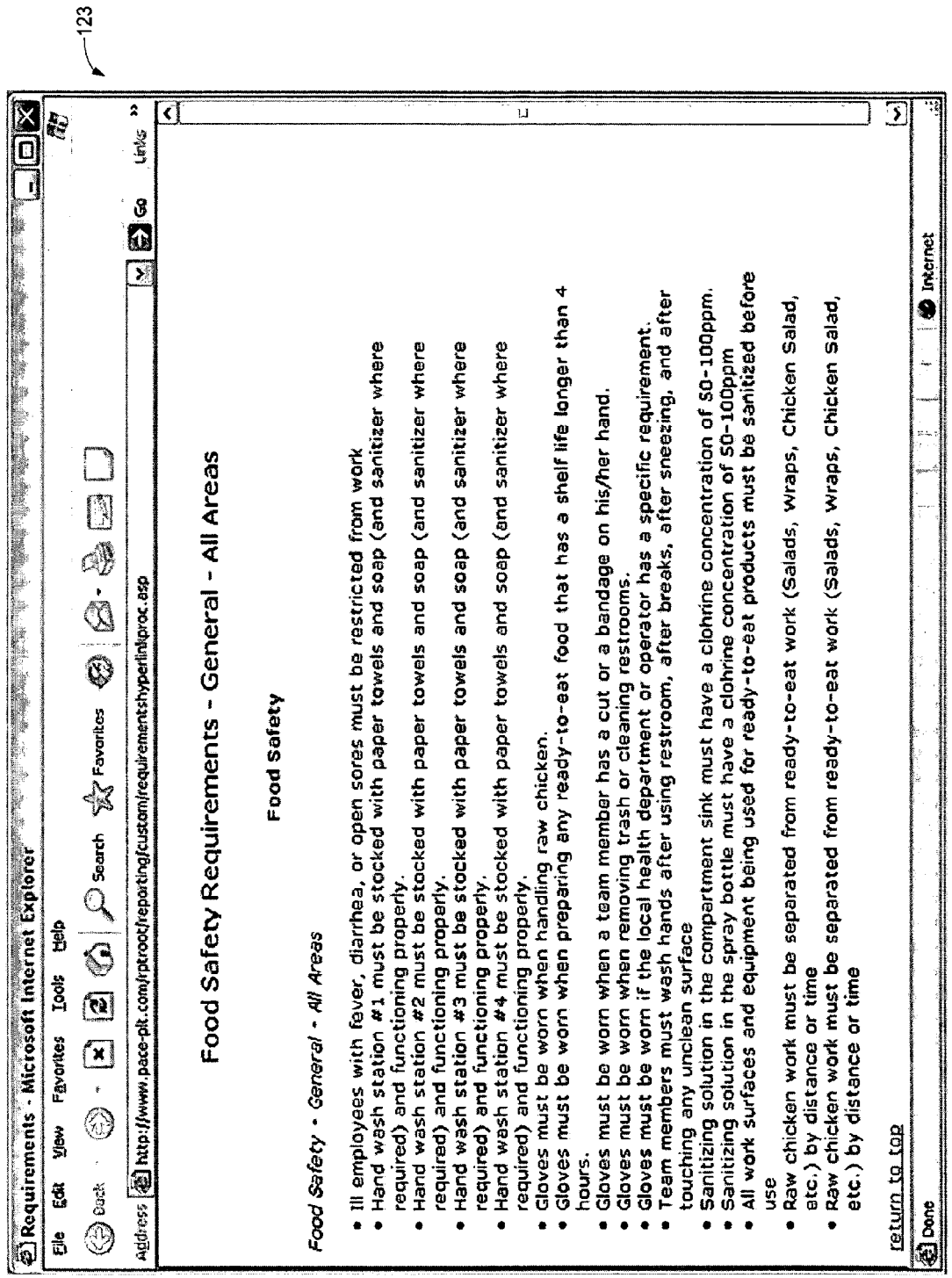
FIG. 1D is an exemplary screen display of software running on the middleware server for creating quality requirements or directives according to one exemplary embodiment of the invention.

Referring now to FIG. 1D, this Figure an exemplary screen display 123 of software running on the middleware server 130 for creating quality requirements or directives according to one exemplary embodiment of the invention. In this Figure, the exemplary screen display 123 can comprise a declarative form of the questions made with the task sheet formation area of FIG. 1C. In the specific embodiment illustrated in FIG. 1D, declarative statements for Food Safety Requirements are listed. A user can edit these statements that will also change the related questions in the corresponding task sheets.

Figure 1E:
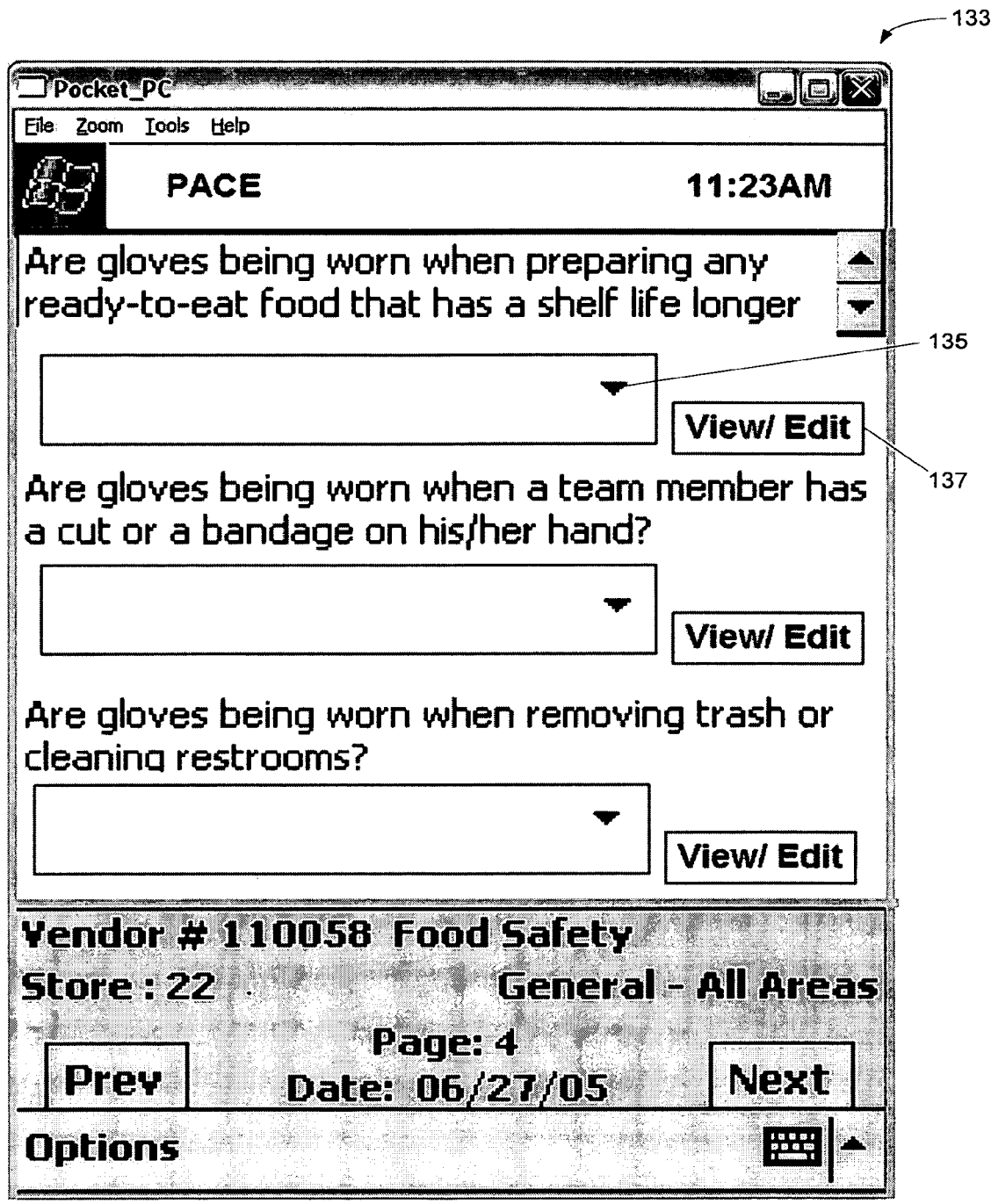
FIG. 1E is an exemplary screen display of software running on a wireless handheld computer for answering questions relating to quality requirements or directives according to one exemplary embodiment of the invention.

Referring now to FIG. 1E, this Figure is an exemplary screen display 133 of software running on a wireless handheld computer 105 for answering questions relating to quality requirements or directives according to one exemplary embodiment of the invention. To answer these questions, a user can use an answer selection button 135 that can display a list of answers that can be selected by a user. Alternatively, a user can key-in answers in the box regions beneath the questions and adjacent to the answer selection buttons 135.

A user can also select a view/edit button 137 to display answers to the questions as well as editing the answers. The view/edit button 137 can also be selected to view the declarative form of the standard or directive that is the basis for a particular question. As noted above, these questions can be the most current measures that have been issued by an organization for accessing the performance of its members. Unlike paper, these questions displayed on a wireless handheld computer 105 can be updated frequently and so that all wireless handheld computers 105 of an organization display the same questions. After the questions are answered, the wireless handheld computers 105 can store the answers until the wireless handheld computers 105 are synchronized with the middleware server 130.

Figure 1F:
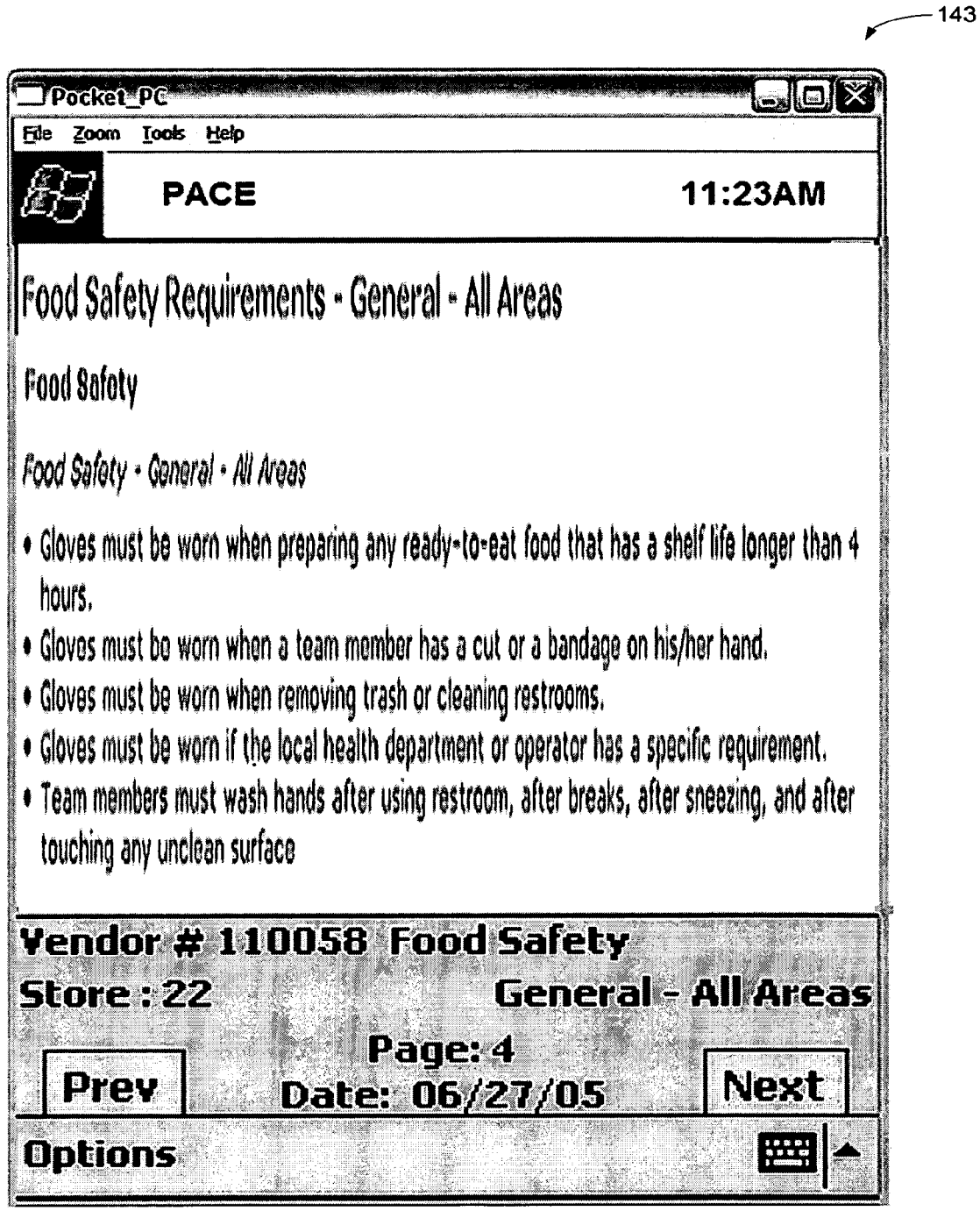
FIG. 1F is an exemplary screen display of software running on a wireless handheld computer for displaying quality requirements or directives according to one exemplary embodiment of the invention.

Referring now to FIG. 1F, this Figure is an exemplary screen display 143 of software running on a wireless handheld computer 105 for displaying quality standards, requirements, or directives according to one exemplary embodiment of the invention. Screen display 143 can be displayed in response to selection of the view/edit button 137 of FIG. 1E. For the specific embodiment illustrated in FIG. 1F, screen display 143 can comprise food safety requirements. These food safety requirements are the same ones produced from the task sheets in FIG. 1C that are also illustrated in FIG. 1D. The screen display 143 can be used by a representative of an organization if he or she needs to understand the larger picture or perspective behind questions being presented on a specific task sheet of a wireless handheld computer 105.

Referring now to FIG. 1G, this Figure is an exemplary screen display 153 of software running on the middleware server 130 for creating summary scoring reports 10 based on answers received from one or more wireless handheld computers 105 at different locations 150 according to one exemplary embodiment of the invention. Each summary scoring report 10 can list location names 13, sheet types 16 used at each location 150 of a member of an organization, points earned 19 at each location 150, points available 22 at each location 150, points earned 25 at each location 150, and questions asked 28 by particular task sheets running on wireless handheld computers 105. With the summary scoring report 153, an organization can assess the relative performance of each one of its members at their respective locations 150. This summary report 153 can be made available on the national public database 155C. The data collected for this summary report 153 can be made by national reps 215C who visit each location with their wireless handheld computers 105C.

Figure 1H:
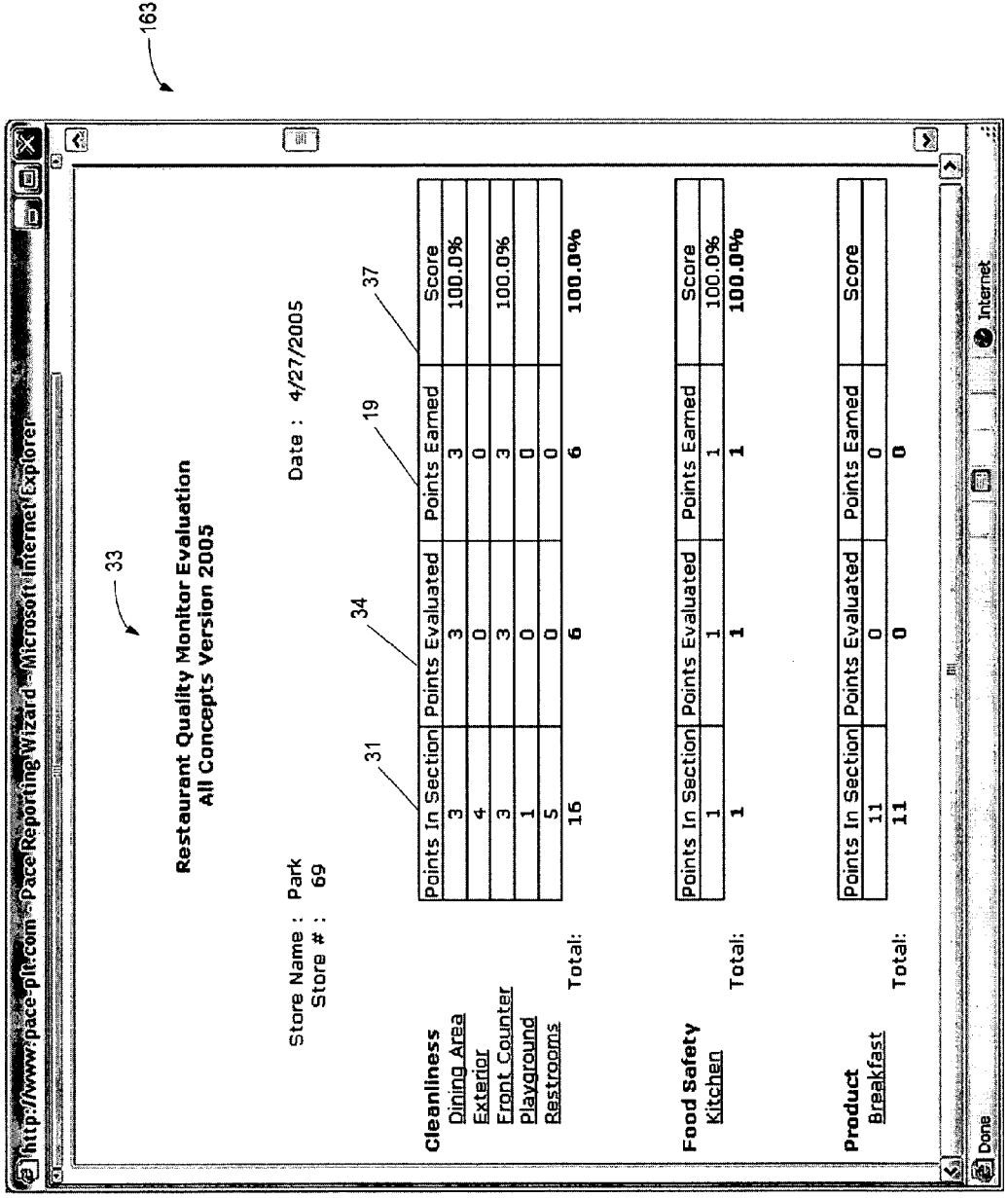
FIG. 1H is another exemplary screen display of software running on the middleware server for creating detailed scoring reports based on answers received from one or more wireless handheld computers at a single location according to one exemplary embodiment of the invention.

Referring to FIG. 1H, this Figure is another exemplary screen display 163 of software running on the middleware server 130 for creating detailed scoring reports 33 based on answers received from one or more wireless handheld computers 105 at a single location 150 according to one exemplary embodiment of the invention. Each detailed scoring report 33 can list the performance of a particular location 150. Each detailed scoring report 33 can list points in a section 31, points evaluated 34, points earned 19, and a score 37. Detailed scoring reports 33 can be completed by both national reps 215C and individual members 215A, 215B.

However, the detailed scoring reports 33 completed by individual members 215A, 215B would not be public and would be stored on the respective private databases 155A, 155B. Detailed scoring reports 33 completed by national reps 215C would be available to all members of an organization through the public national database 155C. The detailed scoring reports 33 can list the scores for particular sections evaluated with their respective subsections. For example, under the section of "Cleanliness," its respective subsections and the scores of the subsections can be displayed. Cleanliness includes the subsections of dining areas, exterior, front counter, playground, and restrooms. As noted above, by keeping detailed scoring reports 33 completed by individual members private, members are more encouraged to answer questions more honestly and thoroughly so that each member can use the reports 33 to improve performance of a location 150 within an organization.

Referring now to FIG. 1I, this Figure is yet another exemplary screen display 173 of software running on the middleware server 130 for creating budget reports 38 based on answers received from one or more wireless handheld computers 105 at different locations 150 according to one exemplary embodiment of the invention. Similar to the detailed scoring reports 33 illustrated in FIG. 1H, each budget report 38 can list points in a section 31, points evaluated 34, points earned 19, and a score 37. The budget report 38 can summarize scores across multiple sections that were evaluated, such as site construction, concrete. metals, wood and plastics, etc. However, unlike the detailed scoring reports 33 of FIG. 1H, the budget reports 38 list sections without any subsections. The budget reports 33 can be completed by both national reps 215C and individual members 215A, 215B. Reports completed by national reps 215C can be made available to members on the national public database 155C while reports completed by individual members 215A, 215B can be stored on respective private databases 155A, 155B.

Figure 1J:
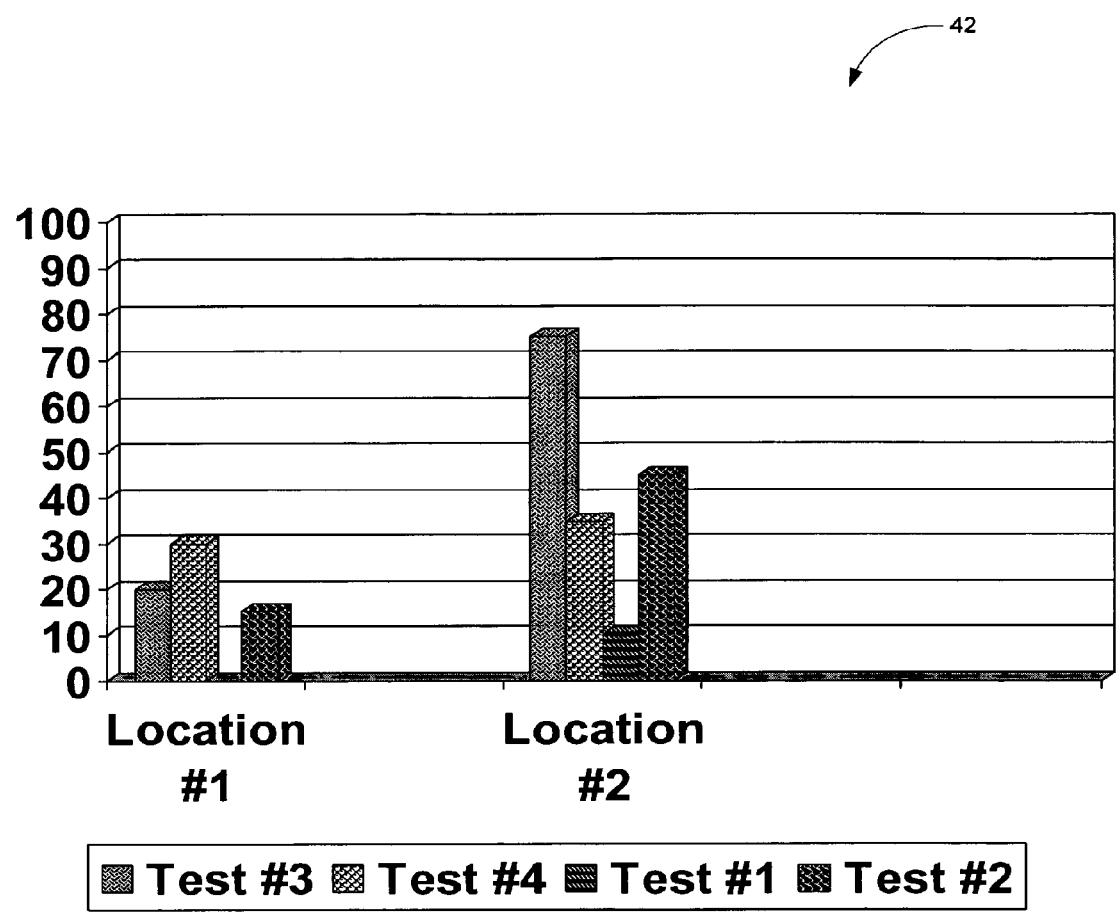
FIG. 1J is a bar chart comparing results of tests from a first location relative to a second location of a organization based on answers received from one or more wireless handheld computers at the two locations according to one exemplary embodiment of the invention.

Referring now to FIG. 1J, this Figure is a bar chart 42 that can compare results of tests from a first location 150A relative to a second location 150B of a organization based on answers received from one or more wireless handheld computers 105 at the two locations 150 according to one exemplary embodiment of the invention. The bar chart 42 can display the results of one or more tests that were performed at respective locations 150. With the bar chart 42, an organization can assess the relative performance of each one of its members at their respective locations 150. This bar chart 42 can be made available on the national public database 155C. The data collected for this bar chart 42 can be made by national reps 215C who visit each location 150 with their wireless handheld computers 105C.

The processes and operations of the middleware software 170 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Figure 2A:
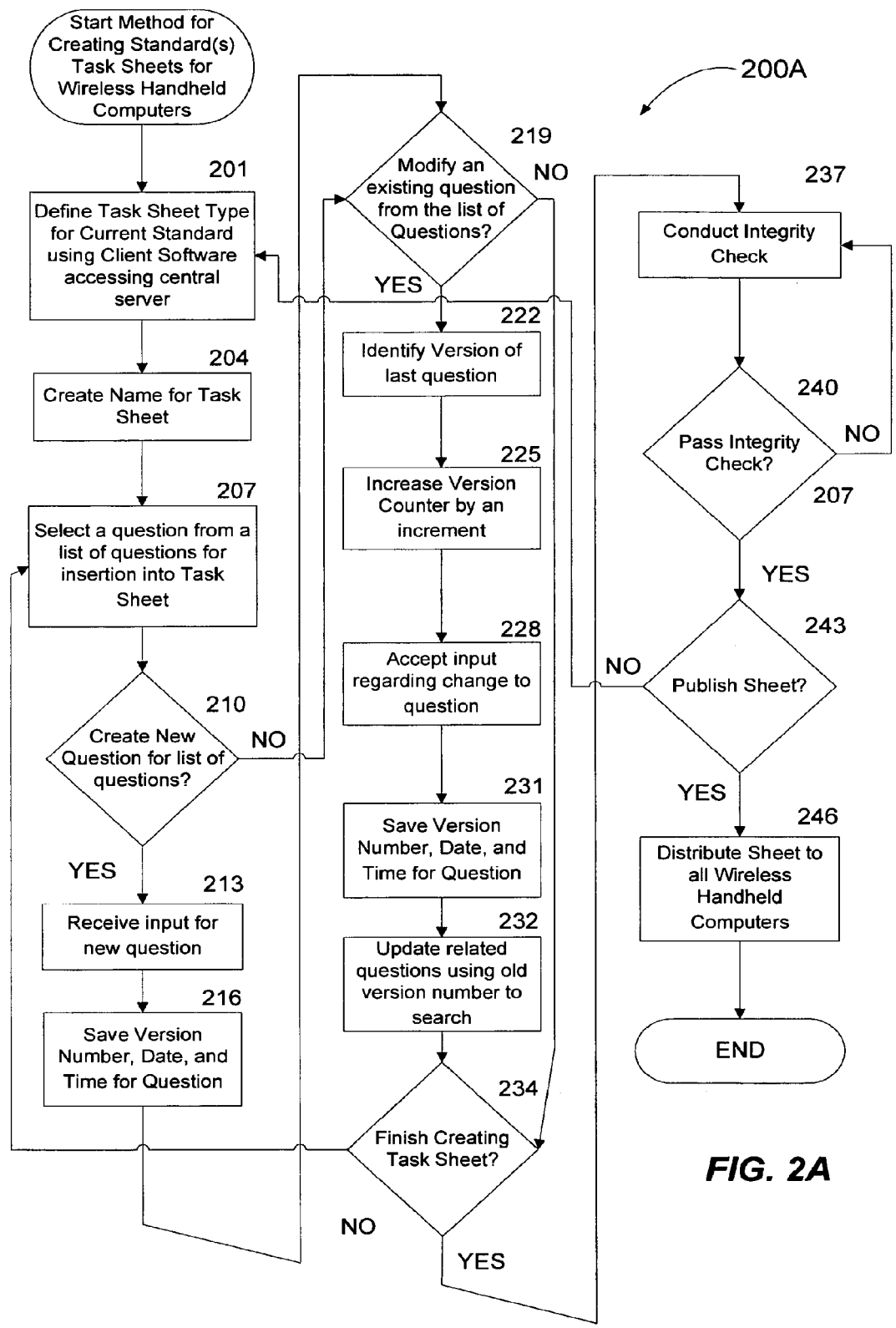
FIG. 2A is a logic flow diagram illustrating an exemplary method for creating task sheets on quality that are destined for wireless hand-held computers according to one exemplary embodiment of the invention.

Referring now to FIG. 2A, this Figure is a logic flow diagram illustrating an exemplary method 200A for creating task sheets on quality that are destined for wireless hand-held computers 105 according to one exemplary embodiment of the invention. Step 201 is the first step in the process in which the task sheet type can be defined for the current standard, policy, or directive being created. Software 170 that executes method 200A can be accessed through the server 130. The type of task sheets that can be created can include, but are not limited to, the following: Call Sheet; Reset Sheet; Survey; Promotion; RTV; PK; Special Project; Cross-Merchandising; Weekend Call Sheet; Store Walk; Inventory; Labels; Sales Driver; Assemble Display; Maintenance; Service Comments; POP; Down Stock; Management; Store Wide; Action Plans; Staffing; New Store Sheet; Planogram Integrity; Events; Order; MAP; Set Integrity; Display Building; Out of Service; Violation; Training; Audits; Inspections; Quality Management; Administrative; Food Safety; and/or Personnel.

Next, in step 204, a name 102 can be assigned for the task sheet being created. See FIG. 1C and the name 102 of "Food Safety" assigned to the task sheet being created in screen display 100. In step 207, a question 107 can be selected from a list 111 of questions as illustrated in FIG. 1C. The selected question 107 can be inserted into the task sheet adjacent to other questions 103.

In decision step 210, it is determined if a new question is desired to be created. If the inquiry to decision step 210 is negative, then the "No" branch is followed to decision step 219. If the inquiry to decision step 210 is positive, then the "Yes" branch is followed to step 213 in which input can be received for a new question. For example, in FIG. 1C input can received in can be saved. The version number, date, and time allow can allow an organization to track the evolution of its policies, procedures, or directives.

In decision step 219, it is determined if an existing question from the list of questions is being modified. If the inquiry to decision step 219 is negative, then the "No" branch is followed to step 234. If the inquiry to decision step 219 is positive, then the "Yes" branch is followed to step 222. In step 222, the version number of the question is identified. Next, in step 225, the version counter is increased by an increment. In step 228, input regarding the change to the question can be accepted. Next, in step 231, the change to the question, the version number, date, and time for the question are stored in memory. In step 232, all questions with the old version number are updated with the modified or new question. In this way, any updates to similar policies, procedures, or directives are automatically updated even if the user is working in a specific area on quality for an organization.

Subsequently, in decision step 234, it is determined if the user is finished with creating the task sheet. If the inquiry to decision step 234 is negative, then the "No" branch is followed back to step 207. If the inquiry to decision step 234 is positive, then the "Yes" branch is followed to step 237.

In step 237, an integrity check is conducted. An integrity check interrogates all of the user defined tasks to ensure that all of the required elements of the task are complete. The system allows a user to do partial work and then complete their work at a later time. The integrity checks ensure that all task formulations created by the user are supported by the various task driven application components. For example, some environments do not support the nesting of looping question types where other environments do. The integrity check will detect non-supported task formulations and prevent these tasks from negatively impacting environments that do not support the task formulation. Performing the integrity check when the user "commits" their work ensures that all required elements are in place before the task is used in subsequent processes such as publishing the task sheet or attaching the task sheet to a task recipient.

In decision step 240, it is determined if the integrity check was successful. If the inquiry to decision step 240 is negative, the "No" branch is followed back to step 237 in which another integrity check is executed. If the inquiry to decision step 240, the "Yes" branch is followed to decision step 243.

In decision step 243, it is determined if the user desires to publish the new created task sheet or updated task sheet to all of the wireless handheld computers 105 that in the organization. If the inquiry to decision step 243 is negative, then the new or updated task sheet is saved and the "No" branch is followed back to step 201. If the inquiry to decision step 243 is positive, then the "Yes" branch is followed to step 246. In step 246, the new created task sheet or updated task sheet is distributed to all the wireless handheld computers 105. The process then ends.

Figure 2B:
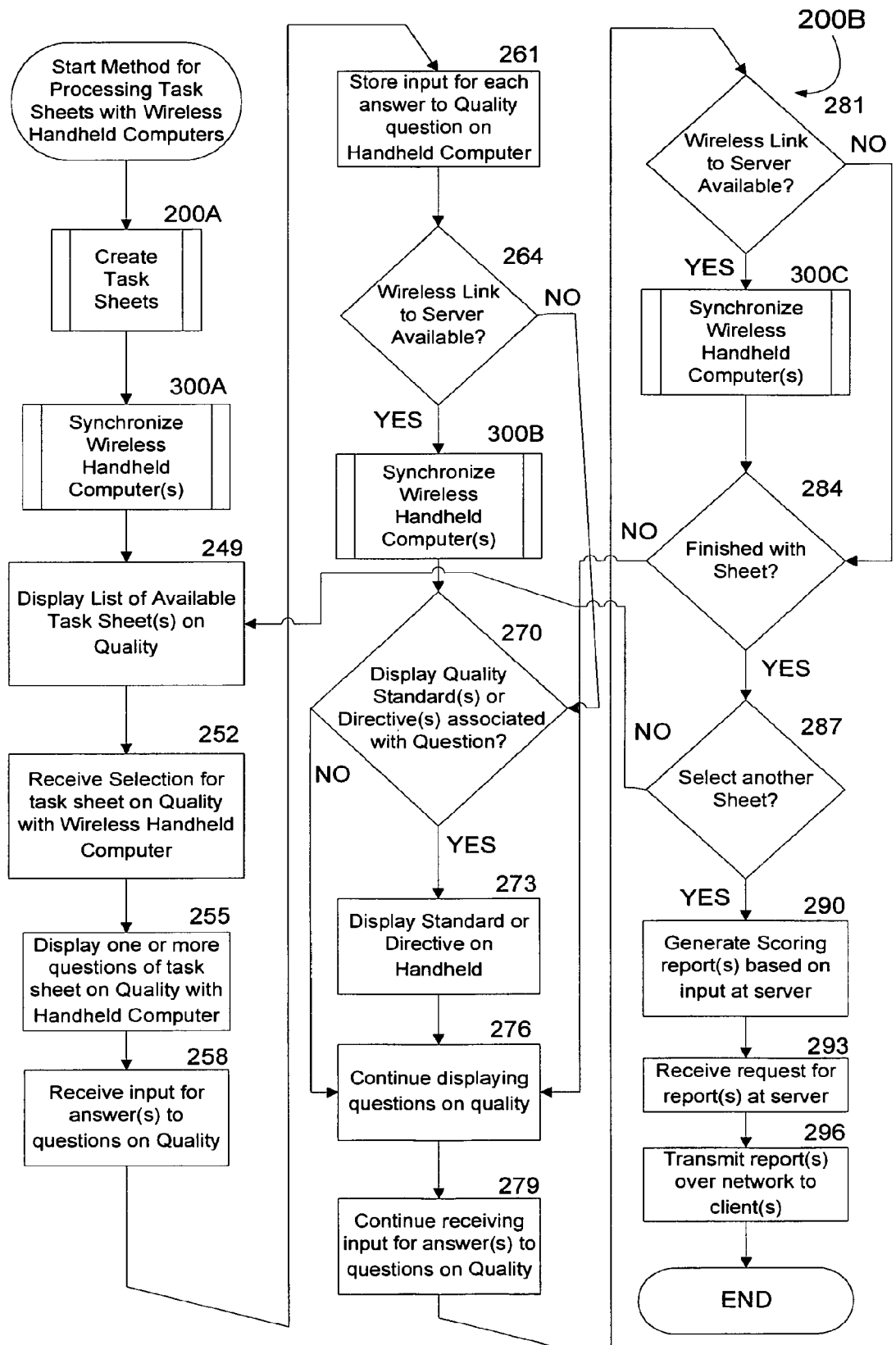
FIG. 2B is a logic flow diagram illustrating an exemplary method for processing task sheets on quality with wireless hand-held computers according to one exemplary embodiment of the invention.

Referring now to FIG. 2B, this Figure is a logic flow diagram illustrating an exemplary method 200B for processing task sheets on quality with wireless hand-held computers 105 according to one exemplary embodiment of the invention. Routine 200A is the first part of the method 200B in which task sheets can be created with the software 170. Details of Routine 200A are illustrated and discussed above in reference to FIG. 2A.

Next, routine 300A is the next stage of method 200B. In routine 300A, one or more wireless handheld computers 105 are synchronized with the server 130 and software 170. Further details of routine 300A are discussed below with respect to FIG. 3. Next in step 249, a list of available task sheets on quality can be displayed with a wireless handheld computer 105. In step 252, a selection for a task sheet on quality can be received with a wireless handheld computer 105. In step 255, one or more questions of a task sheet on quality can be displayed with a wireless handheld computer 105 as illustrated in FIG. 1E.

In step 258, input for answer(s) to questions on quality can be received with one or more wireless handheld computers 105. Next, in step 261, input for each answer to questions on quality can be stored with a wireless handheld computer 105. In decision step 264, it is determined if a wireless link to server 130 is available. If the inquiry to decision step 264 is negative, then the "No" branch is followed to decision step 270. If the inquiry to decision step 264 is positive, then the "Yes" branch is followed to routine 300B in which the wireless handheld computer 105 is synchronized. Further details of routine 300B are discussed below in connection with FIG. 3.

In decision step 270, it is determined if a standard, directive, or procedure associated with a question on quality of a task sheet should be displayed. In this step, a user. can select the view/edit button 137 in order to view the declarative form of a standard, directive, or procedure associated with question of a task sheet on quality. If the inquiry to decision step 270 is negative, then the "No" branch is followed to step 276. If the inquiry to decision step 270 is positive, then the "Yes" branch is followed to step 273 in which the standard or directive associated with a question can be displayed with a wireless handheld computer 105. For example, see FIG. 1F, that illustrates Food Safety requirements that are associated with questions of a task sheet.

Next, in step 276, the questions on quality of a task sheet can be displayed on the wireless handheld computer 105. In step 279, input for one or more answers to the questions of quality can be received with the wireless handheld computer 105. In decision step 281, it is determined if a wireless link to server 130 is available. If the inquiry to decision step 281 is negative, then the "No" branch is followed to decision step 284. If the inquiry to decision step 281 is positive, then the "Yes" branch is followed to routine 300C in which the wireless handheld computer 105 is synchronized. Further details of routine 300C are discussed below in connection with FIG. 3.

In decision step 284, it is determined if a user is finished with the task sheet being displayed on a wireless handheld computer 105. If the inquiry to decision step 284 is negative, then the "No" branch is followed back to step 276. If the inquiry to decision step 284 is positive, then the "Yes" branch is followed to decision step 287. In decision step 287, it is determined if the user of the wireless handheld computer 105 desires to work on another task sheet. If the inquiry to decision step 287 is negative, then the "No" branch is followed back to step 249. If the inquiry to decision step 287 is positive, then the "Yes" branch is followed to step 290 in which the server 130 can generate a scoring report based on the input received by one or more wireless handheld computers 105. Exemplary scoring reports are illustrated in FIGS. 1G-1I.

In step 293, requests are received at the server 130 for one or more scoring reports. In step 296, the one or more scoring reports can be transmitted over the network 120 to desktop computer 145 or wireless handheld computers 105 (or both).

Figure 3:
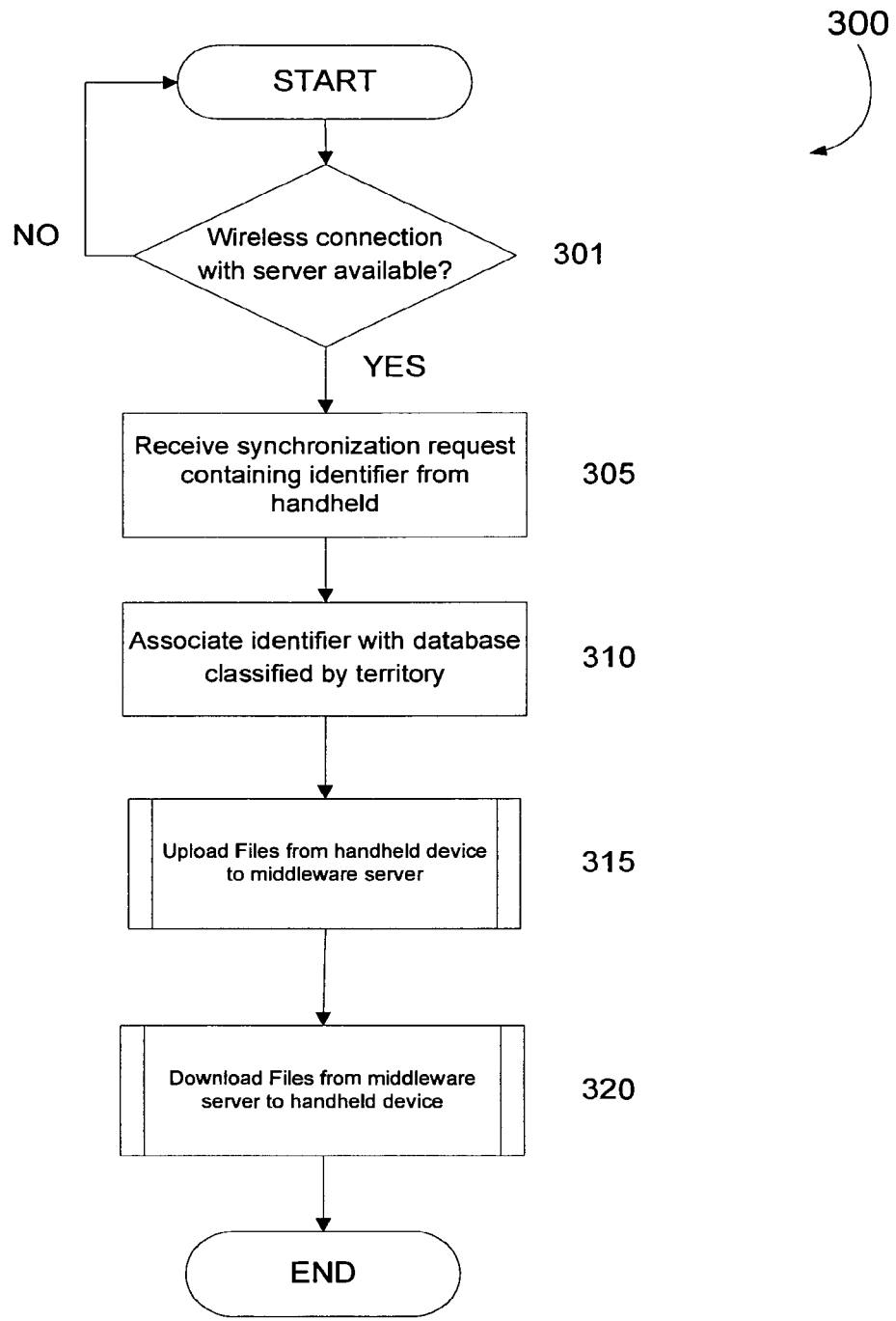
FIG. 3 is a logic flow diagram illustrating an exemplary method for synchronizing wireless hand-held computers with a middleware server according to one exemplary embodiment of the invention.

Referring now to FIG. 3, this Figure is a logic flow diagram illustrating an exemplary routine 300 for synchronizing wireless hand-held computers 105 with a middleware server 130 according to one exemplary embodiment of the invention. Details of routine 300 are more fully described in U.S. patent application Ser. No. 11/317,646, entitled "System and Method For Communicating Data Between wireless Mobile Hand-Held Computer and a Back-End Computer System," filed on Dec. 23, 2005, now U.S. Pat. No. 8,028,039, which is hereby fully incorporated herein by reference.

However, an overview of this synchronization routine 300 is provided below. After it is determined that a wireless connection is available in step 301, the middleware server 130 receives a synchronization request containing a particular identifier from the wireless handheld computer 105 in step 305. In step 310, the middleware server 130 associates the identifier with the database 135. The identifier can associate each member into different groups or classifications in the database. For example, a member of an organization may be associated with different divisions or territories based on where the member is assigned. These classifications make it more efficient to determine the updated information that the members receive on their wireless handheld computers 105.

In routine 315, the files are uploaded from the wireless handheld computers 105 to the middleware server 130. Upon successful storage of the upload file, the middleware server 130 acknowledges successful upload to the wireless handheld computers 105. Upon acknowledgement, the wireless handheld computer 105 archives and/or deletes the source upload file and continues to transmit each remaining upload file following the same process. Routine 315 will be discussed in more detail below in reference to FIG. 4. After processing all upload files, the wireless handheld computer 105 downloads files from the middleware server 130 in routine 320. Routine 320 will be discussed in more detail below in reference to FIG. 5. Upon completion of the upload and download protocols, the wireless handheld computer 105 then disconnects from the middleware server 130 without awaiting an acknowledgement that the files were received intact and successfully stored in the appropriate database.

Figure 4:
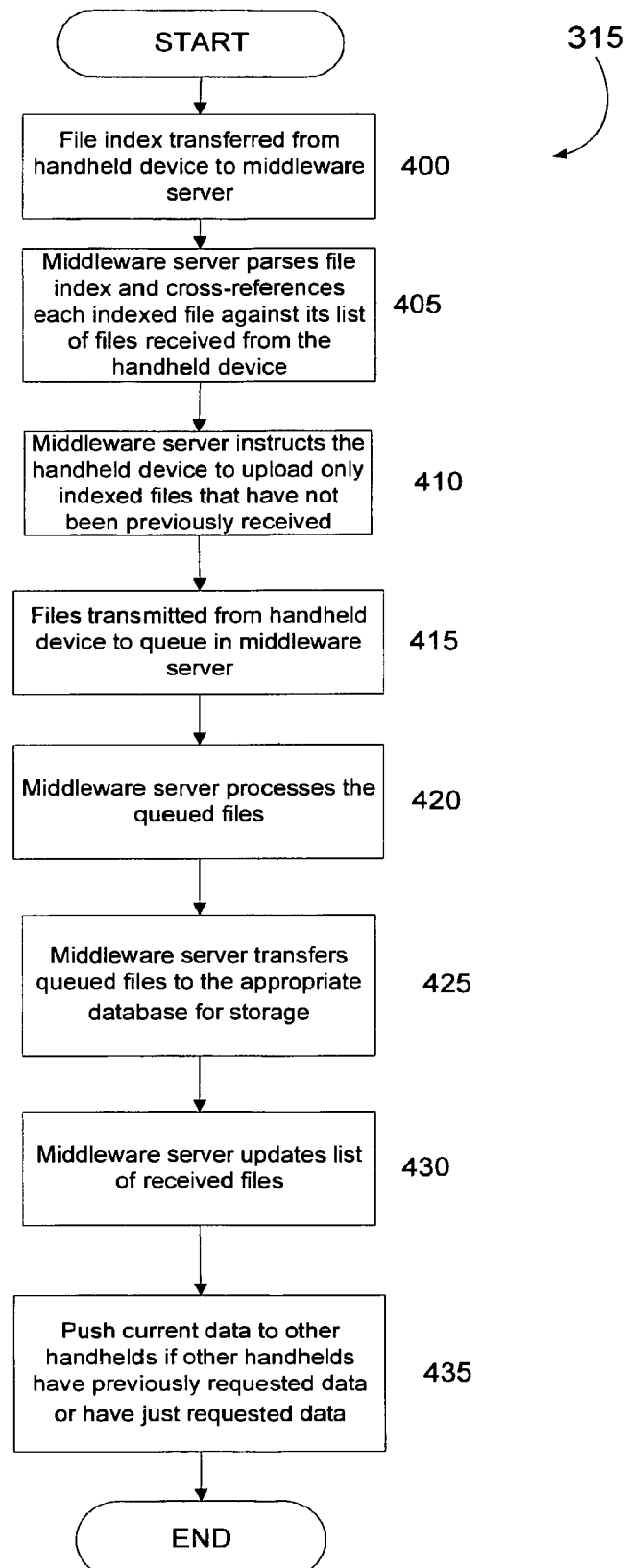
FIG. 4 is a logic flow diagram illustrating an exemplary method for uploading files from a wireless hand-held computer to a middleware server according to one exemplary embodiment of the invention.

Referring now to FIG. 4, this Figure is a logic flow diagram illustrating an exemplary method 315 for uploading files from a wireless hand-held computer to a middleware server 130 according to one exemplary embodiment of the invention. The exemplary routine 315 is merely illustrative and, in alternative embodiments of the invention, certain steps can be performed in a different order, in parallel with one another, certain steps can be omitted entirely, and/or certain additional steps can be performed.

According to the middleware software 170, uploads from a wireless handheld computer 105 to the middleware server 130 are meant to be "fast and dumb." To facilitate a rapid upload process, the middleware client 170 specifies that each wireless handheld computer 105 maintains an index of files to be uploaded to the middleware server 130. In step 400, the index is transmitted to the middleware server 130 during the initial synchronization request of step 305. In step 405, the middleware server 130 parses the index received from the wireless handheld computer 105 and cross-references each indexed file against its list of files received from the wireless handheld computer 105.

In step 410, the middleware server 130 then instructs the wireless handheld computer 105 to upload only those indexed files that have not been previously received and/or not received within a certain timeframe by the middleware server 130.

In step 415, the wireless handheld computer 105 uploads its files to a queue on the middleware server 130. In step 420, the middleware server 130 processes the queued files. Part of the processing in step 420 involves formatting the queued files into an understandable format. In step 425, the middleware server 130 transfers the queued files to the database 155.

In step 430, any files received intact from the wireless handheld computer 105 are added to the list maintained by the middleware server 130. The list may be specific to the wireless handheld computers 105 (e.g., identified by a handheld identification number) and may record the date and time of reception for each file.

Finally, in step 435, the database 155 can communicate through the middleware server 130 again to utilize the middleware software 170 to transmit updated task sheets to wireless handheld computers 105 that have previously requested the data or to wireless handheld computers 105 that have just requested the data. The transmission of the updated or newly created task sheets allows the wireless handheld computers 105 connected to the network to have near real-time access to the new or updated information.

Figure 5:
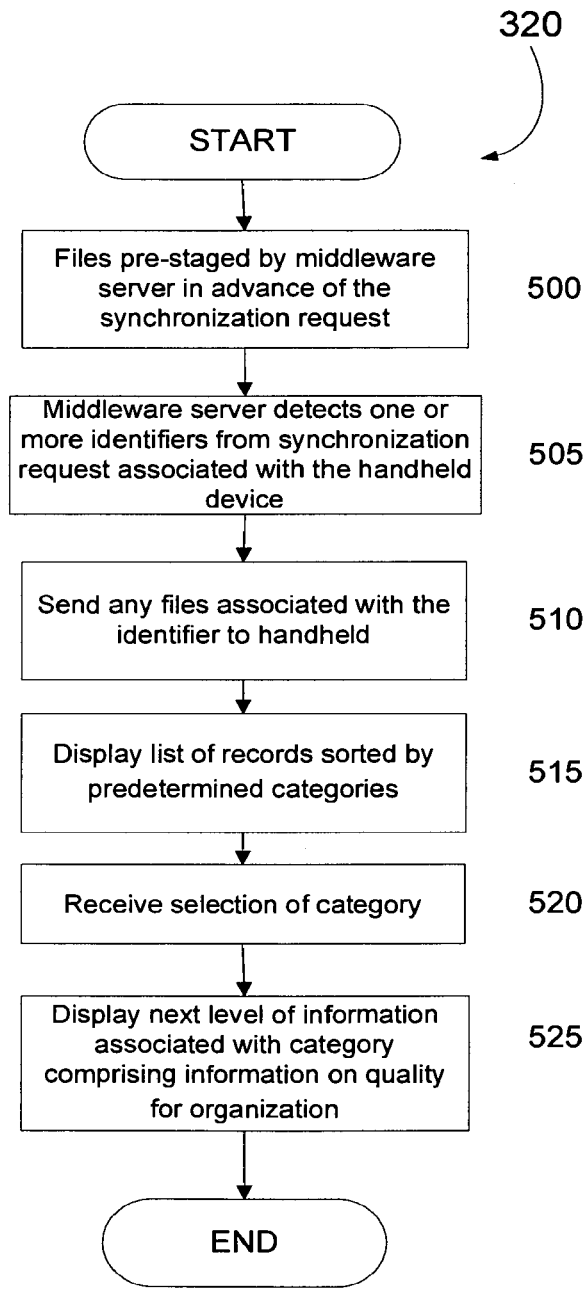
FIG. 5 is a logic flow diagram illustrating an exemplary method for downloading files from a middleware server to a wireless hand-held computer according to one exemplary embodiment of the invention.

Referring now to FIG. 5, this Figure is a logic flow diagram illustrating an exemplary method 320 for downloading files from a middleware server 130 to wireless hand-held computers 105 according to one exemplary embodiment of the invention. The exemplary routine 320 is merely illustrative and, in alternative embodiments of the invention, certain steps can be performed in a different order, in parallel with one another, certain steps can be omitted entirely, and/or certain additional steps can be performed.

According to the middleware software 170, files downloaded from the middleware server 130 to the handheld device 105 are staged in advance of the file synchronization request in step 305. Therefore, in step 500, the middleware server 130 will have previously determined which files need to be downloaded to the wireless handheld computer 105 in advance of the receipt of a synchronization request. Files may be associated with particular wireless handheld computers 105, particular groups of members of an organization, particular locations 150, etc., by assigning unique identifiers to any such entities. When a file synchronization request is received at the middleware server 130 from a wireless handheld computer 105 in step 305, the middleware server 130 may detect one or more identifiers associated with the wireless handheld computer 105 in step 505. In step 510, the middleware server 130 transmits any files associated with the identifier(s) to the wireless handheld computer 105. A hierarchy of priorities for each type of identifier (e.g., handheld device ID, group ID, etc.) may be established so that file downloads may be managed at the device level and/or at the group level. A determination as to whether to download a file to a wireless handheld computer 105 may be based on the "last change" date of the file and/or the date the file was last sent to the wireless handheld computer 105. Of course, such dates may be ignored in an appropriate case and all files associated with the identifier(s) of the wireless handheld computer 105 may be downloaded.

After receiving the files in step 510, the wireless handheld computer 105 sorts and displays new or updated task sheets on quality in step 515 based on the software of the wireless handheld computer 105 and the preferences set a member. In step 520, a member 215 can make selections on the wireless handheld computer 105 to view the particular categories in order to review the customer information. After the member 215 makes a selection, the wireless handheld computer 105 can display the next level of information associated with the particular category comprising the most current information on quality for the organization.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention as defined by the following claims. It should also be understood that the invention is not restricted to the illustrated embodiments and that various modifications can be made within the scope of the following claims.

What is claimed is:

1. A method for monitoring quality of a retail business comprising the steps of:
   preparing a first set of a plurality of files with a server in advance of receiving a synchronization request that are associated with a unique identifier and comprising information about the retail business;
   receiving a synchronization request containing the unique identifier over a computer network at a middleware server;
   receiving a file index from a source over the computer network at the middleware server, the file index comprising a list of files available from the source for upload to the middleware server;
   comparing the file index to a file list at the middleware server;
   in response to the comparing the file index step, transmitting a message from the middleware server over the computer network that indicates which files from the source should be transmitted to the middleware server; and
   transmitting the first set of the plurality of files associated with the unique identifier and comprising the information about the retail business from the server over the computer network.

2. The method of claim 1, wherein the information about the retail business comprises information about quality of the retail business.

3. The method of claim 1, wherein the computer network comprises a wireless network.

4. The method of claim 1, wherein the source comprises a wireless handheld computer.

5. The method of claim 1, further comprising receiving a second set of a plurality of files from the source over the computer network that have not been previously received with the middleware server after transmitting the message.

6. The method of claim 1, wherein the step of receiving a synchronization request further comprises associating the unique identifier with at least one database.

7. The method of claim 1, further comprising determining whether a wireless connection with the computer network is available.

8. The method of claim 5, further comprising formatting the second set of the plurality of files into a readable format at the middleware server; and updating the file list maintained by the middleware server.

9. The method of claim 8, further comprising transmitting task sheets comprising quality information about the organization via the computer network.

10. The method of claim 9, further comprising creating a scoring report.

11. A system for monitoring a retail business comprising:
a file index that identifies a first set of files ready for uploading to a server, the first set of files being associated with a unique identifier and comprising information about the retail business, the file index comprising a list of files available for upload to a middleware server; and
the middleware server coupled to a computer network, the middleware server preparing a plurality of a second set of files in advance of receiving a synchronization request from the computer network, the synchronization request comprising a unique identifier; the server receiving the file index from the computer network and comparing the file index to a file list; the server in response to the comparing the file index step, transmitting a message from the middleware server to the computer network that indicates which files should be transmitted to the middleware server; after sending the message, the middleware server receiving the plurality of the first set of files that have not been previously received by the middleware server via the computer network; the server transmitting a plurality of the second set of files associated with the unique identifier and comprising information about the retail business to the computer network.

12. The system of claim 11, wherein the information about the retail business comprises information about quality of the retail business.

13. The system of claim 11, wherein the computer network comprises a wireless network.

14. The system of claim 11, further comprising a handheld wireless computer responsible for generating the file index and the first set of files.

15. The system of claim 14, wherein the wireless handheld computer runs software comprising tests on quality information corresponding to the organization.

16. The system of claim 15, wherein the middleware server creates a scoring report based on input received over the computer network.

17. A method for monitoring a retail business comprising the steps of:
defining a task sheet type for monitoring the retail business;
selecting a question from a list of questions for insertion into the task sheet;
inserting the question into the task sheet;
preparing the task sheet advance of receiving a synchronization request;
receiving a synchronization request containing a unique identifier from a computer network at a middleware server, the file index comprising a list of files available for upload from a source to the middleware server;
receiving a file index from the computer network with a middleware server;
comparing the file index to a file list at the middleware server;
in response to the comparing the file index step, transmitting a message from the middleware server to the computer network that indicates which files should be transmitted to the middleware server;
after sending the message, receiving a plurality of files from the computer network that have not been previously received by the middleware server; and
transmitting the task sheet from the server to the computer network.

18. The method of claim 17, further comprising receiving input for creating a new question for the list of questions.

19. The method of claim 18, further comprising tracking at least one of a version number, date, and time for each question in the list of questions.

20. The method of claim 19, further comprising conducting an integrity check prior to transmitting the task sheet over the computer network to a wireless handheld computer.

* * * * *